US010239249B2

(12) United States Patent
Vignon et al.

(10) Patent No.: US 10,239,249 B2
(45) Date of Patent: Mar. 26, 2019

(54) EXTRUDER INCLUDING AN IMPROVED HOMOGENISING MEMBER AND METHOD FOR EXTRUDING A VISCOUS MATERIAL

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Fabien Vignon, Clermont-Ferrand (FR); Jean-Francois Lhospitalier, Clermont-Ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 172 days.

(21) Appl. No.: 15/106,734

(22) PCT Filed: Dec. 19, 2014

(86) PCT No.: PCT/EP2014/078925
§ 371 (c)(1),
(2) Date: Jun. 20, 2016

(87) PCT Pub. No.: WO2015/092054
PCT Pub. Date: Jun. 25, 2015

(65) Prior Publication Data
US 2016/0325479 A1    Nov. 10, 2016

(30) Foreign Application Priority Data

Dec. 20, 2013   (FR) .................................... 13 63250

(51) Int. Cl.
*B29C 47/92*    (2006.01)
*B29C 47/50*    (2006.01)
(Continued)

(52) U.S. Cl.
CPC ................ *B29C 47/92* (2013.01); *B29B 7/50* (2013.01); *B29C 47/361* (2013.01);
(Continued)

(58) Field of Classification Search
CPC ............................... B29C 47/50; B29C 47/92
(Continued)

(56) References Cited

U.S. PATENT DOCUMENTS 1,991,959 A * 2/1935 Roser ....................... A21C 1/04
                                                    366/79
2,200,997 A    5/1940 Royle
(Continued)

FOREIGN PATENT DOCUMENTS

CN           1741880 A    3/2006
CN          101992538     3/2011
(Continued)

*Primary Examiner* — David L Sorkin
(74) *Attorney, Agent, or Firm* — Dickinson Wright PLLC

(57) ABSTRACT

An Extruder for shaping a viscous material such as a blend of rubber is disclosed herein. The extruder includes a screw rotationally driven about an axis (XX') in a barrel and bearing one or more helical flights extending radially outwards from a central shaft of the screw, the extruder comprising a material homogenization zone (H) through which a screw portion comprising interrupted flight elements forming empty annular spaces extends axially, and a barrel portion delimiting the said homogenization zone bearing flight elements extending radially inwards into the said empty annular spaces. According to the disclosure, the barrel portion delimiting the homogenization zone is itself rotationally driven about the axis XX' to form a rotary barrel.

24 Claims, 6 Drawing Sheets

(51) Int. Cl.
  B29B 7/50 (2006.01)
  B29C 47/36 (2006.01)
  B29C 47/60 (2006.01)
  B29B 7/42 (2006.01)
  B29C 47/66 (2006.01)
  B29K 21/00 (2006.01)

(52) U.S. Cl.
  CPC .......... *B29C 47/6062* (2013.01); *B29B 7/422* (2013.01); *B29C 47/666* (2013.01); *B29C 2947/92019* (2013.01); *B29C 2947/9259* (2013.01); *B29C 2947/92209* (2013.01); *B29K 2021/00* (2013.01)

(58) Field of Classification Search
  USPC .................................. 366/79, 81, 82, 90, 95
  See application file for complete search history.

(56) References Cited

U.S. PATENT DOCUMENTS

| | | |
|---|---|---|
| 3,102,894 A | 9/1963 | Frenkel |
| 3,164,375 A | 1/1965 | Frenkel |
| 3,921,794 A | 11/1975 | Casselbrant |
| 4,199,263 A | 4/1980 | Menges et al. |
| 6,709,147 B1 | 3/2004 | Rauwendaal |

FOREIGN PATENT DOCUMENTS

| | | |
|---|---|---|
| DE | 2116273 | 10/1972 |
| DE | 3150757 A1 | 7/1982 |
| DE | 3805849 A1 | 9/1989 |
| FR | 2580984 | 10/1986 |
| GB | 842692 | 7/1960 |
| JP | S5532630 | 3/1980 |

\* cited by examiner

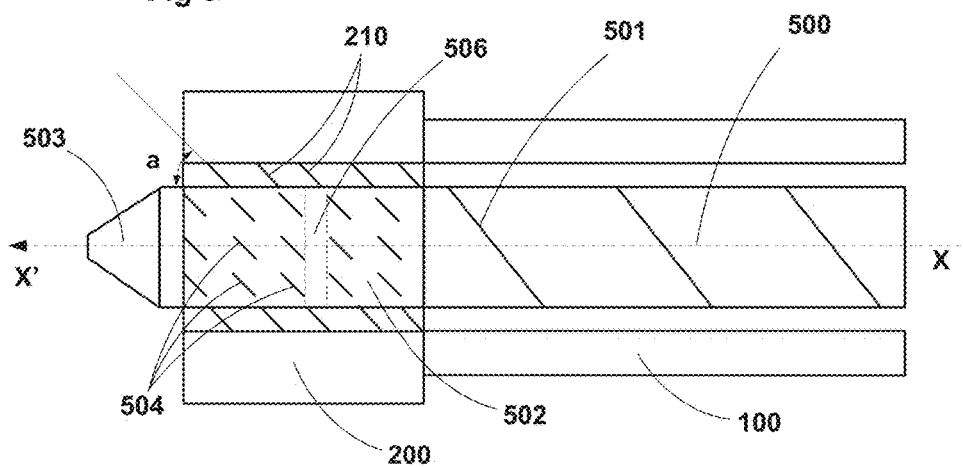
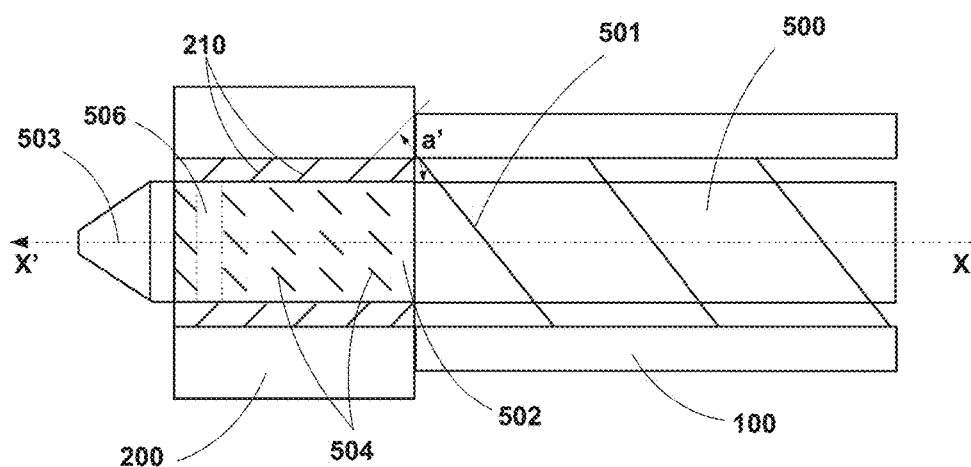

EXTRUDER INCLUDING AN IMPROVED HOMOGENISING MEMBER AND METHOD FOR EXTRUDING A VISCOUS MATERIAL

CROSS-REFERENCE TO RELATED APPLICATIONS

This application is a 371 national phase entry of PCT/EP2014/078925, filed 19 Dec. 2014, which claims the benefit of French Patent Application No. 1383250, filed 20 Dec. 2013, the contents of which are incorporated herein by reference for all purposes.

BACKGROUND

The disclosure relates to the field of the extrusion of plastics materials and, more particularly, rubber-based materials.

Traditionally, these materials are shaped using an extrusion means comprising a threaded endless screw, rotated inside a cylindrical barrel and opening onto profiling means.

In order to improve the characteristics of the products obtained, numerous adaptations have been made to extruder design, more particularly extruder screw designs. Thus, as is known, there is a feed zone, intended to receive the materials in a solid or not very viscous state, followed by a working or plasticizing zone in which the pressure and temperature of the material are raised so that it can be transferred downstream of the device, a homogenization zone in which the material is kneaded in order to ensure that its properties are suitably uniform, and a final part opening into an extrusion die or into a shaping device such as a mold. Most of the energy supplied to the material comes from the mechanical energy transmitted by the extrusion screw which is converted into heat energy under the effect of the shearing that the material experiences as it passes through the various working zones listed hereinabove.

The disclosure is more particularly concerned with the homogenization zone which aims to render the rheological characteristics such as the temperature and fluidity throughout the outgoing material isotropic.

Solutions, notably those described in documents U.S. Pat. No. 3,164,375. GB 842 692, U.S. Pat. No. 3,102,694 or JP S55 32630, in which the barrel of the extruder comprises flights which are set in rotation with respect to the flights of the rotary screw, are known. The flights of the screw and of the barrel are continuous and are the vertices thereof are spaced radially along the entire length of the extruder. Because of this arrangement of the flights, as the screw and the barrel rotate, the stream of material flowing between the flights of the screw is mixed with that of the flights of the barrel, without, however, it being possible for high shearing forces to be applied to the blend.

In order to remedy this problem, other documents describe this part of the extrusion tool as comprising pins, of the type described in publication U.S. Pat. No. 6,709,147, or fixed knives, proposed by way of example in publication FR 2 580 984, opening radially into the internal space of the barrel and collaborating with the interrupted screw flights.

The shape and orientation of the knives or of the flight elements have the essential aim of subdividing and recombining the streams of material a great many times as explained in detail in publication DE 31 50 757 or publication DE 38 05 849. The homogenization zone therefore comprises a succession of flight element stages, advantageously in the form of blades and which are borne respectively by the screw and by the barrel. The flight elements borne by the screw are configured in such a way as to leave empty annular spaces in which the stationary flight elements arranged on the internal wall of the barrel run.

However, it is found that the amount of energy conferred upon the rubber blend at the homogenization zone remains high, and is not always suited to the type of material that it is designed to use.

One solution then is to make the pins radially mobile, as described in publication U.S. Pat. No. 4,199,263, so that the number of pins, and therefore the level of work obtained, can be adapted to suit the nature of the blend. One and the same extruder can then be configured simply on each change of production sequence or during one same production sequence, to allow it to work very different blends such as blends based on synthetic rubbers or blends based on natural rubbers.

Nevertheless, the extrusion screw, the shape of which is designed to accept a great many pins, remains in place inside the barrel between two production sequences. Further, the amount of energy conferred upon the blend may still prove to be too high when the composition of the material is sensitive to a rise in temperature or when the material does not require a very high degree of homogenization.

SUMMARY

It is an object of the disclosure to provide a solution to this situation so as to allow a broad range of rubber blends of different rheologies to be extruded using one and the same extrusion tool.

The extruder according to the disclosure comprises a screw rotationally driven about an axis in a barrel and bearing one or more helical flights extending radially outwards from a central shaft of the screw, the extruder comprising a material homogenization zone through which a screw portion comprising interrupted flight elements forming empty annular spaces extends axially, and a barrel portion delimiting the said homogenization zone bearing flight elements extending radially inwards into the said empty annular spaces beyond the vertices of the flight elements of the screw. This extruder is characterized in that the barrel portion delimiting the homogenization zone is itself rotationally driven about the axis to form a rotary barrel.

According to the disclosure, a screw portion in the homogenization zone comprises flight elements extending radially outwards, which are interrupted to form empty annular spaces into which the flights of a barrel portion extend radially inwards. Thus, the flights of the screw and those of the barrel intermesh, the flights of the barrel extending radially beyond the flights of the rotary barrel. The flights of the screw and of the barrel produced in this way are rotationally driven making it possible to obtain better shearing of the blend in this portion of the homogenization zone, while at the same time this work can be altered according to the speed and direction of rotation of the screw and of the barrel.

In this way it becomes possible to achieve more fine adjustment of the load supplied by the machine as a function of the material of the blend passing through it and to obtain a very homogeneous blend at output.

For preference, the homogenization zone of the screw comprises at least one ring mounted on the screw comprising the said flight elements which are imbricated between the said flight elements borne by a barrel-forming ring. A ring comprising screw flight elements imbricated between the barrel flight elements is understood to mean that the vertices of the flights of the screw and those of the barrel extend radially beyond the vertices of the flights of the barrel and are superposed axially on the width of the ring. This makes it possible to obtain a very compact assembly capable of developing high shear forces. Advantageously, this set of rings is removably mounted on the extruder, in order to provide even greater flexibility in adjusting the loads applied to the blend.

Advantageously, the diameter of the screw in the zone of the extruder that lies upstream of the homogenization zone is less than the diameter of the screw in the homogenization zone. This makes it possible to maintain a constant cross section for the passage of the material between the zone upstream of the homogenization zone and the latter, so that the material does not suffer any pressure drop as it passes from one zone to the other and so that it can thus be better worked. For preference, it has been found during laboratory testing that the outside diameter of the screw in the upstream zone needs to be 1.2 to 2 times smaller than the outside diameter of the screw flights in the homogenization zone, the value being chosen as a function of the size of the machine and of the type of material worked in order to ensure correct homogeneity thereof as it leaves the extruder.

For preference, the barrel portion delimiting the homogenization zone is rotationally driven by drive means independent of the screw drive means. It will thus be appreciated that the said barrel portion is rotationally driven by a geared motor unit distinct from the one that rotationally drives the screw.

It then becomes possible to set the direction or speed of rotation of the screw and of the rotary barrel independently of one another so as to vary the number of cuttings or subdivisions of the rubber blend.

The extrusion throughput supplied by the extruder can also be increased because the energy supplied to the blend comes from the means that drive the barrel portion delimiting the homogenization zone which are distinct from those that drive the screw.

The disclosure may also be varied in alternative forms of embodiment in which the preferred features are as follows:
  the homogenization zone is positioned in the downstream part of the extrusion line.
  the flight elements borne by the rotary barrel form, with the axis of rotation XX', a positive angle such that they are organized in a helix oriented in the same direction as the direction of the helix formed by the flights of the screw.
  the flight elements borne by the rotary barrel form, with the axis of rotation XX', a negative angle such that they are organized in a helix oriented in the opposite direction to the direction of the helix formed by the flights of the screw.
  the flight elements borne by the rotary barrel form, with the axis of rotation XX', a zero angle.
  one or more flight elements borne by the rotary barrel are individually rotationally driven on themselves about a radial axis.
  in the homogenization zone, the flight elements of the screw and of the rotary barrel have the form of a blade comprising at least one cutting edge facing the upstream end of the homogenization zone.
  the flight elements borne by the rotary barrel are pins of substantially cylindrical shape.

The disclosure also relates to the method for implementing an extrusion device having the features listed hereinabove and in which the speed of the rotary barrel with respect to the speed of the screw and/or the direction of rotation thereof is/are varied in order to alter the rheological state of the blend flowing through the homogenization zone.

For preference, it is also possible:
  to control the difference in rotational speed between the screw and the rotary barrel as a function of the temperature of the blend at the inlet to the homogenization zone.
  to control the difference in rotational speed between the screw and the rotary barrel as a function of the roughness of the material at the outlet of the extruder.
  to control the difference in rotational speed between the screw and the rotary barrel as a function of the variation in efficiency of the extruder.
  to make the rotary barrel rotate in the same direction of rotation as the screw at the same or a higher speed.
  after the extruder has been stopped for some time, to make the rotary barrel rotate while keeping the screw stationary, so as to raise the temperature of the blend contained in the homogenization zone again.
  to make the rotary barrel rotate at a rotational speed lower than the rotational speed of the screw or in the opposite direction to the direction of rotation of the screw.
  to drive the rotation of the rotary barrel solely under the effect of the forward motion of the blend propelled by the rotation of the screw and flowing in the homogenization zone.
  to apply a braking torque to the rotary barrel so that the rotational speed of the rotary barrel is lower than the rotational speed of the screw.
  to make the screw and the rotary barrel rotate alternately in the same direction and in opposite directions in order successively to empty the various stages of flights situated in the homogenization zone.

BRIEF DESCRIPTION OF THE DRAWINGS

The disclosure will be better understood from studying the attached figures which are given by way of entirely nonlimiting example and in which:

FIGS. 8 and 9 depict particular arrangements of the helical orientation of the flight elements in the homogenization zone with respect to the orientation of the flights of the screw.

DETAILED DESCRIPTION

Figure 1:
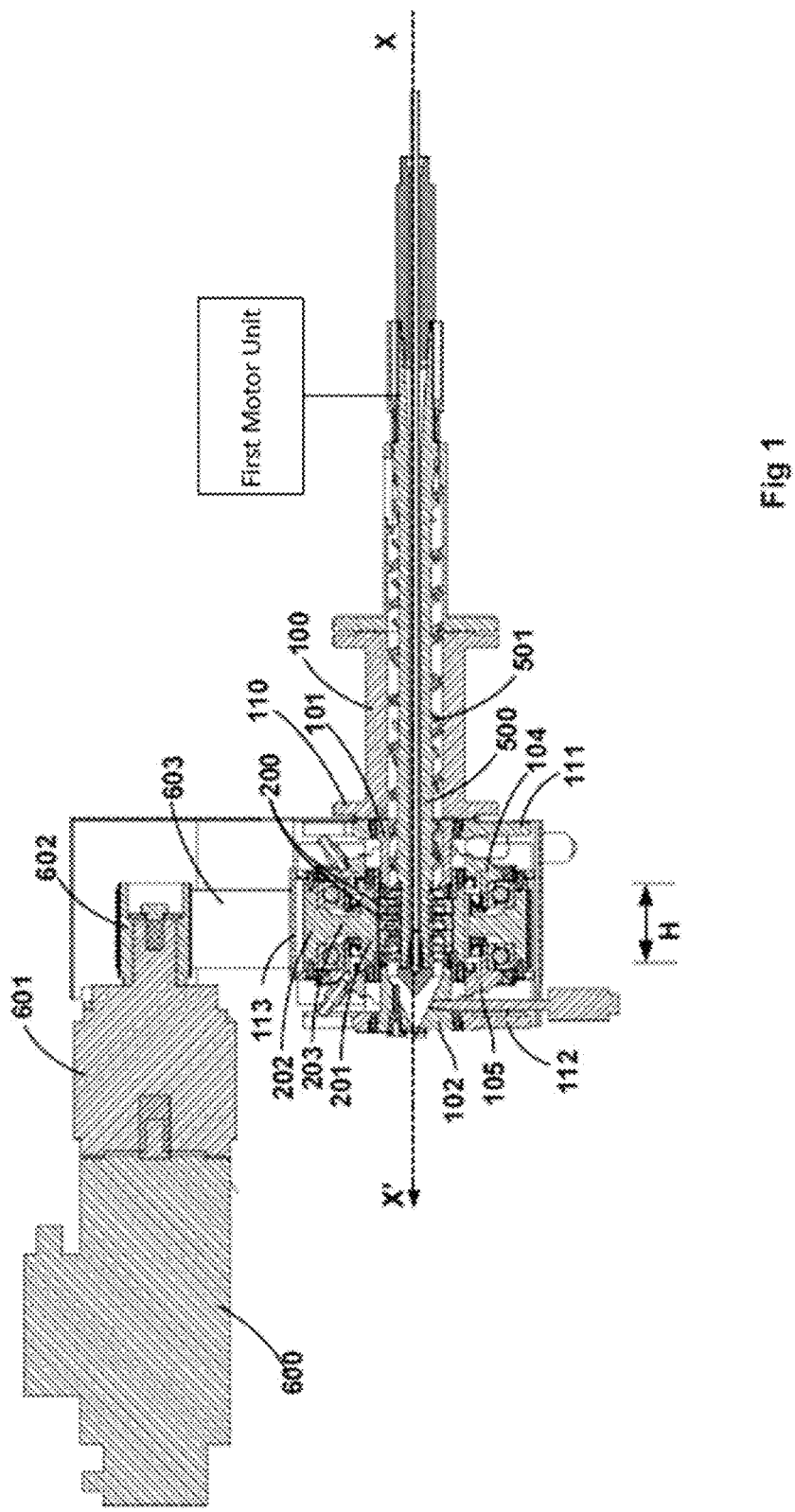
FIG. 1 depicts a schematic general view in cross section of an extruder according to the disclosure.
Figure 2:
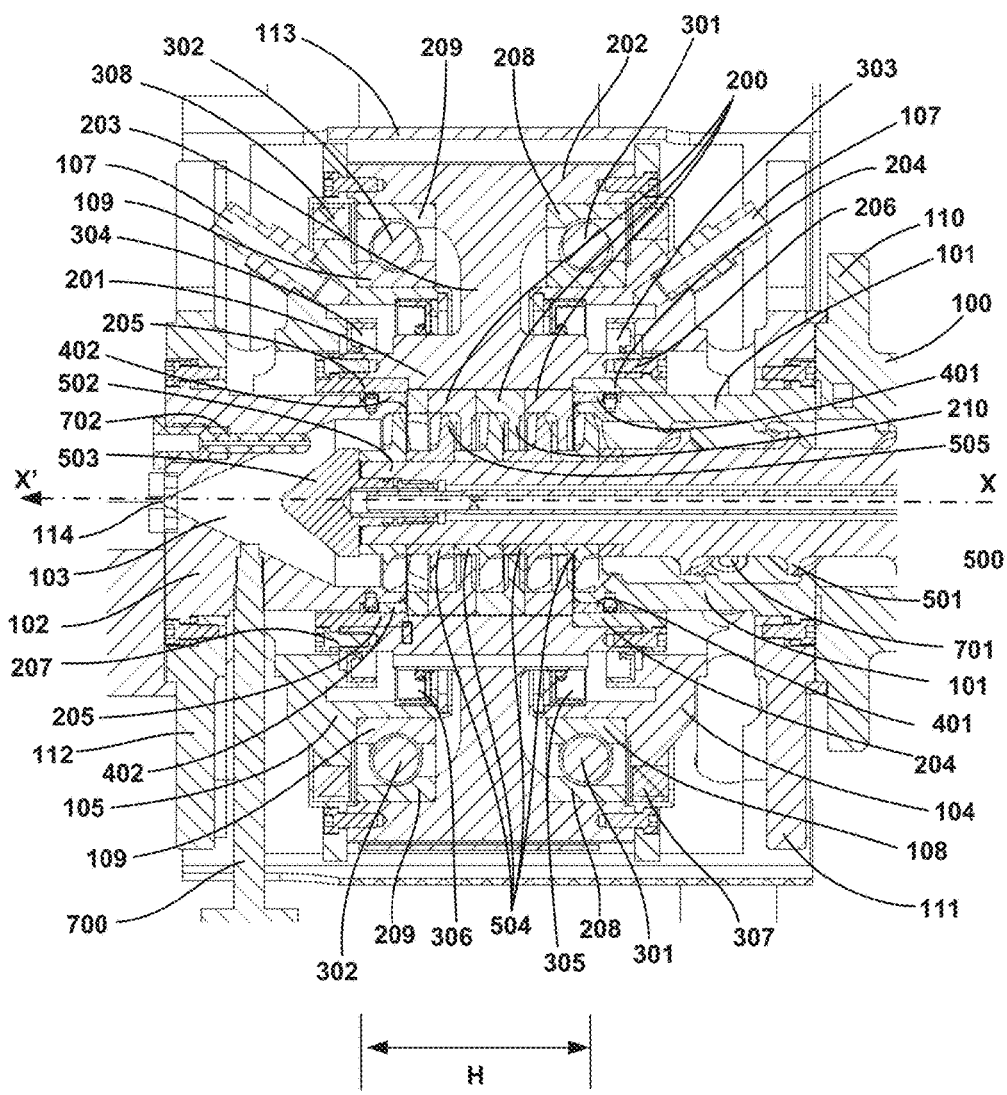
FIG. 2 depicts a more detailed view in cross section of the homogenization zone.

The extrusion device illustrated in FIG. 1 and, in greater detail, in FIG. 2 comprises a screw the shaft 500 of which supports one or more helical flights 501. The screw is rotationally driven in a plain or flighted stationary barrel 100, about a central axis XX' by a first geared motor unit assembly schematically illustrated in FIG. 1. The flights of the screw 501 extend radially outwards from the body or central shaft 500 of the screw and are oriented in the overall form of a helix, so that the material progresses in the extrusion device from upstream to downstream in the direction of the axis XX'.

The terminal part of the stationary barrel 100, downstream of the extruder, supports the mechanical assembly in which the rotary barrel is incorporated.

This mechanical assembly comprises a support structure formed of two retaining rings: an upstream retaining ring 111 fixed to a fixing flange 110 positioned at the end of the stationary barrel 100 by a set of bolts (not depicted) and a frontal retaining ring 112. The two retaining rings 111 and 112 are joined together by a bearing cap 113, to which they are fixed by sets of bolts (not depicted).

The frontal retaining ring 112 supports the tip 102 of the extruder in which is housed the arch 103 opening into the extrusion duct 114.

A stationary barrel head 101 extends the barrel 100 downstream and internally and is connected thereto by bolting (not depicted).

The axial portion of the extruder situated between downstream of the barrel head 101 and upstream of the arch 103 forms a zone H devoted to homogenizing the blend, in which zone the homogenization device comprising the actual rotary barrel is situated.

The shaft of the screw 500 comprises a terminal part 502 situated in the homogenization zone H, which supports an end cone 503 occupying some of the interior space of the arch 103.

In the homogenization zone H, the terminal part 502 of the shaft 500 supports a plurality of rings 504 comprising flight elements 505 (see FIG. 3 for greater detail) extending radially outwards. The flight elements 505 are arranged axially in such a way as to leave empty annular spaces 506 or channels (with reference to FIGS. 8 and 9) intended to accept the flight elements supported by the rotary barrel. The flight elements 505 are arranged with respect to one another in the form of a helix in the same direction as the helix formed by the flights 501 of the screw.

Two bearer rings 104 and 105 are fixed respectively to the upstream retaining ring 111 and to the frontal retaining ring 112. These two bearer rings 104 and 105 support the rotary assembly consisting of the mechanical elements that form the rotary barrel.

Figure 3:
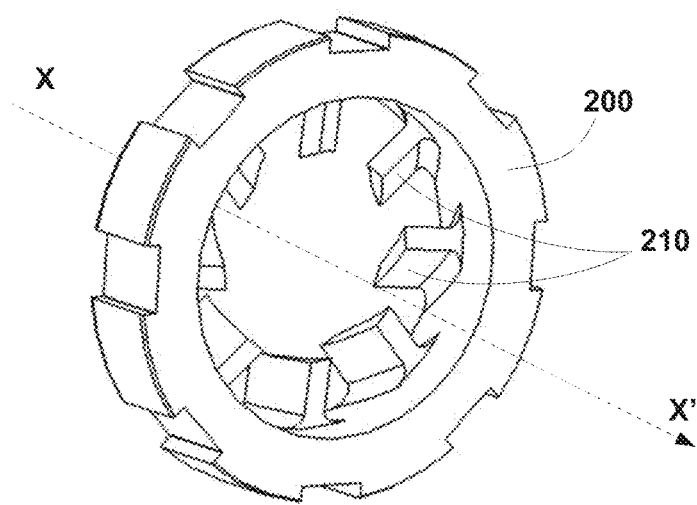
FIG. 3 depicts a schematic perspective view of the flight elements of a rotary barrel ring.

The rotary barrel proper is made up of a plurality of rings 200 supporting flight elements 210 extending radially inwards as illustrated in FIG. 3. The flight elements 210 are arranged axially in the annular spaces 506 left empty by the elements 210 of the screw. Thus, the flight elements arranged on the screw and on the rotary barrel can rotate freely about the axis XX' without coming into contact with one another.

The rings 200 are supported by a bearing first hollow shaft 201, which is connected by a connecting rim 203 to a driving second hollow shaft 202.

Two raceways are created axially on the radially internal parts of the driving shaft 202, these respectively being 208 and 209, and on the radially external parts of the bearer rings 104 and 105, these being respectively 108 and 109, and between these raceways there run two sets of balls, 301 and 302 respectively, providing for the rotation of the bearing shaft and of the driving shaft about the axis XX'.

Leaks from the internal part of the homogenizer, through which the rubber blends flow under pressure, are prevented by a set of dry bearings 401 and 402 respectively. These bearings are installed respectively on the radially external part of the barrel head 101, and on the radially external part of the tip 102. The dry bearings 401 and 402 slide over wearing surfaces 204 and 205 fixed respectively by a set of bolts 206 and 207 respectively to the two axially opposed parts of the radially internal part of the bearing hollow shaft 201. In an alternative form, use may be made of scraping seals of the double-acting composite seal type in order to provide the sealing of the internal part of the homogenizer.

Passages 106 and 107 allow temperature-regulating fluid to circulate within the rotary barrel. Rotary seals 303, 304, 305, 306, 307, 308 provide sealing between the stationary parts and the rotating parts.

The driving hollow shaft 202 is rotationally driven by a chain 603 connected to sprockets 602 arranged at the output end of a geared motor unit 601 driven by a motor 600.

Means for measuring the temperature 702 or the pressure upstream or downstream of the homogenization zone, respectively 701 and 700, may be installed to gather information regarding the rheological state of the blend in the process of being extruded and before it leaves the device.

The extrusion device used as a basis for the present description proposes arranging the homogenization zone H in the downstream part of the extruder, namely immediately upstream of the tip 102 and of the arch 103. However, it is entirely possible to site a rotary barrel according to the disclosure further upstream, at the head of the extruder for example. The rotary barrel can then be used to help plasticize the blend through a rapid increase in temperature. This action may be augmented when the flight elements of the rotary barrel are rotationally driven about their radial axis.

The shape of the flight elements arranged on the screw or on the rotary barrel may be varied in numerous ways chosen according to the variety of the blends that are to be employed and the effects that are to be attained.

In order to improve the degree of homogenization of the outgoing blend, efforts will be made to increase the number of cuts, namely the number of subdivisions and re-combinations of the stream that allows each elementary volume of the blend to be mixed.

Figure 6:
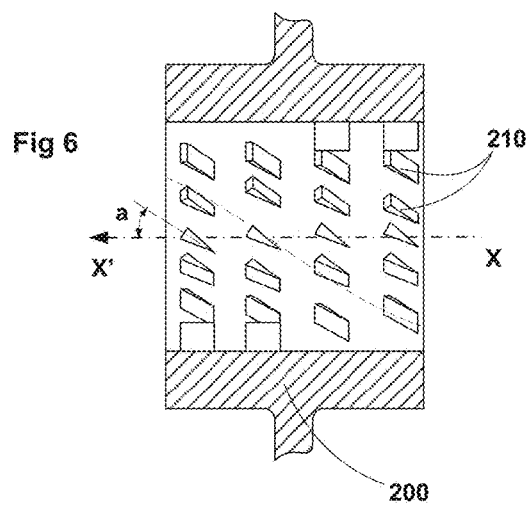

To do that, flight elements 210, 505 for the rotary barrel and for the screw will be chosen to have the form of a blade, having at least one sharp cutting edge able to separate the streams of material. This cutting edge is positioned on the upstream side and faces into the oncoming stream of material as illustrated in FIG. 6.

For preference, the flight elements 210 of the rotary barrel are organized relative to one another on substantially helicoid lines (see FIG. 6) with a view to performing the function of emptying the extrusion tool at the end of the sequence and of reducing the pressure drop induced by the homogenizer under certain operating conditions.

Figure 7:
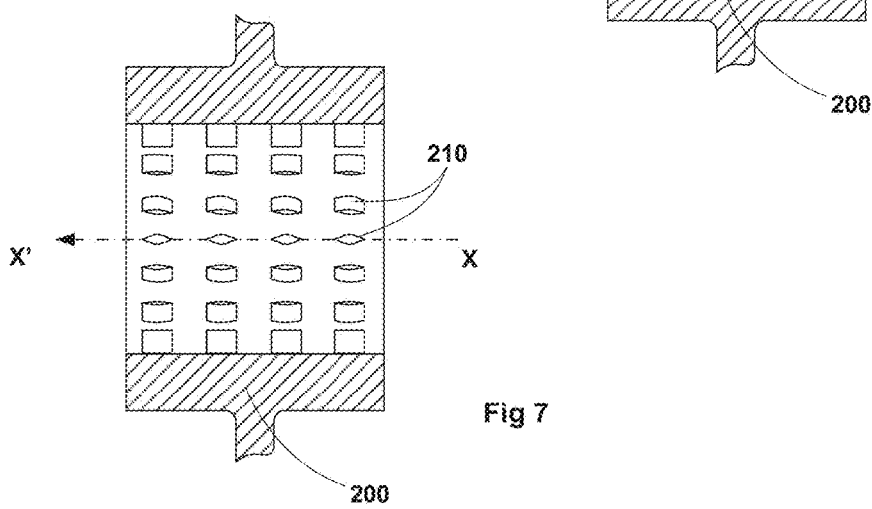

Optionally, the blades may have a second cutting edge positioned downstream of the direction in which the stream flows, as illustrated in FIG. 7.

The blades 210 of the rotary barrel form, with the axial direction XX', an angle that may be positive, zero or negative depending on the effects that are to be obtained. The angle a will be considered to be positive when the flight elements formed by the blades 210 are organized to form a helix oriented in the same direction as the orientation of the helix of the flights 501 and 505 of the screw as illustrated in FIG. 8; and the angle a' is negative when the flight elements formed by the blades 210 are organized to form a helix oriented in the opposite direction to the orientation of the helix of the flights 501 and 505 as illustrated in FIG. 9. The angle is zero when the blades are oriented substantially in the direction of the axis XX' as illustrated in FIG. 7.

Figure 5:
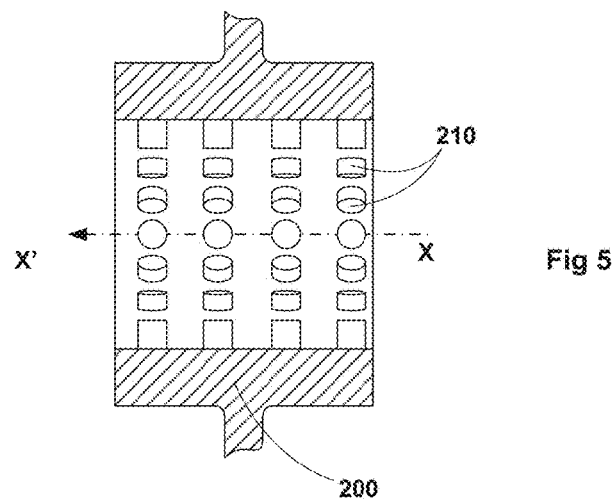
FIGS. 5, 6 and 7 depict particular forms and arrangements of the flight elements of the rotary barrel.

The flight elements may also be arranged in the form of cylindrical pins extending radially inwards from the radially internal face of the ring 200, as illustrated in FIG. 5.

Further, in order to increase the shearing effects, the pins or the flight elements may also be made to rotate about their radial axis, by installing in the rotary barrel suitable additional mechanical devices as suggested hereinabove.

When using an extruder comprising the features described hereinabove it becomes possible to vary the direction and speed of rotation of the rotary barrel in order to adapt the tool to suit blends with very different rheological properties, but some of these features may also be modified during the course of extruding.

Figure 4:
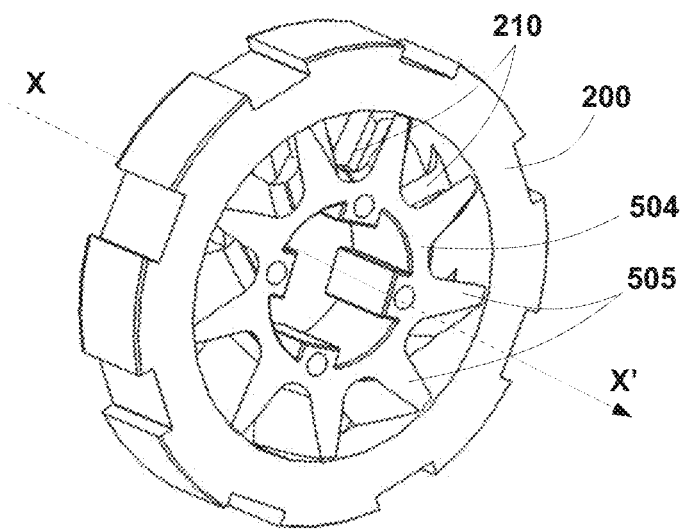
FIG. 4 depicts a schematic perspective view of the flight elements of the screw depicted inside a rotary barrel ring.

The number of cuts, namely the number of subdivisions that can be achieved per revolution will depend on the rotational speed, on the number of stages each made up of the combination of a ring borne by the screw 505 and of a ring borne by the rotary barrel 200, as illustrated in FIG. 4, on the number of flight elements (210, 504) present in a stage and on the direction of rotation of the barrel with respect to the screw.

By making the rotary barrel rotate in the same direction as the screw and at the same speed thereas, the number of cuts will be zero, the homogenizer will behave like an additional purely passive stabilization stage through which the blend flows receiving only the energy associated with the pressure drop caused by the passage through the spaces left empty between the flight elements of the screw and of the rotary barrel. In this configuration then, care will be taken to arrange the flight elements of the screw and of the barrel relative to one another angularly in such a way as to leave a passage of sufficient cross section that the pressure drop created is not too great.

Figure 10:
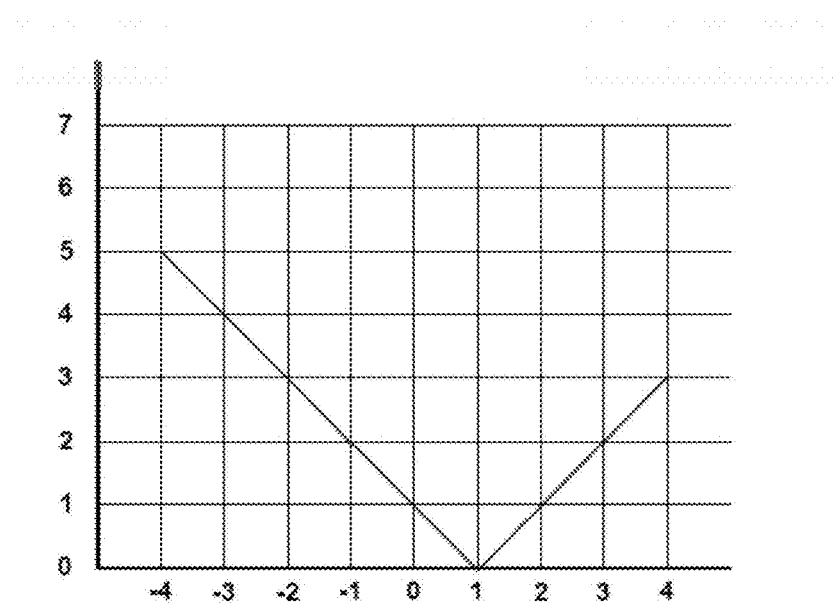
FIG. 10 depicts the number of cuts performed as a function of the speed ratio between the screw and the rotary barrel.

FIG. 10, in which the abscissa axis represents the speed ratio between the rotary barrel and the screw and the ordinate axis represents the number of cuts of the blend performed per revolution by a flight element provides a better understanding of how the homogenizer works.

When the rotary barrel rotates in the same direction and at the same angular speed as the screw, the ratio between the two speeds is equal to one, and the number of cuts, as seen hereinabove, is equal to zero.

When the rotary barrel still rotates in the same direction as the screw but at a higher speed, the number of cuts increases in proportion with the increase in this ratio. In this configuration, the rotary barrel also behaves like a pressure generator. This configuration can therefore be used to benefit when there is a wish to increase the throughput of the machine without excessively increasing the temperature of the blend or when there is a wish to increase the overall throughput of the extrusion line.

When the rotary barrel rotates at a speed lower than that of the screw or when it rotates in the opposite direction, the number of cuts also increases because of the fact that the rotary barrel then generates a negative pressure drop like transfer of work to the blend. In the case where the flight elements bone by the barrel forms with the axis XX' a negative helix angle (a') of the rings and the barrel rotates at a speed lower than that of the screw or in the opposite direction, then the rotary barrel is a pressure generator. In the case where the flight elements borne by the barrel forms with the axis XX' a positive helix angle (a) of the rings and the barrel rotates at a higher speed than that of the screw then the rotary barrel is a pressure generator.

Thus, the person skilled in the art will be able to adapt the direction and shape of the helixes, the angle of the blades, the number of stages and the number of flight elements per stage, the direction and speed of rotation, according to the range of blends he wishes to use in the extrusion device. He may thus use one and the same tool to extrude a range of blends with a broad range of compositions and rheological characteristics and within the combination of possibilities offered will find numerous specific applications suited to his needs.

One of the possible applications is that of reducing the number of homogenizer stages in order to reduce the degree to which the material is heated while at the same time maintaining optimal quality of homogenization.

Another application is to alter the relative speeds in such a way as to optimize the work supplied to the blend during the transient phases associated with stoppages and restarts of the extrusion tool during the course of one and the same sequence, or for emptying out the blend remaining in the extruder at the end of a production sequence.

Thus, after a stoppage of the extrusion machine, for a change in extrusion profile for example, the blend lying in the homogenization zone may have a tendency to cool, whereas the blend present in the body of the screw upstream may have a tendency to heat up. (The blend adopts the temperature of the machine elements, and in general the screw is at 90° C. the barrel at 90° C. and the rotary barrel at 50° C.). When the tool is restarted, the screw is kept stationary for a few moments and the rotary barrel is made to rotate in order to raise the level of heat in the blend that has remained in the homogenization zone for the duration of the stoppage. The screw is then restarted at low speed while making the rotary barrel rotate in the same direction in order to avoid conferring an increase in temperature upon the hot blend that has resided upstream of the homogenization zone. When the temperature conditions of the blend have stabilized, the rotational speed of the screw and of the rotary barrel can then be increased in order to achieve the optimal operating throughput of the extrusion tool.

The extruder of the disclosure can be used to improve the appearance of the product leaving the machine. In order to do that the difference in rotation speed between the screw and the rotary barrel is controlled as a function of the roughness of the material leaving the extruder, which roughness is captured by an optical sensor or camera positioned at the outlet of the machine. Thus, when the roughness of the outgoing product is unsatisfactory, the rotational speed of the rotary barrel with respect to that of the screw is increased by causing it to rotate in an opposite direction to the former, this having the effect of increasing the number of cuts and therefore the amount of work supplied to the blend until the desired roughness is obtained.

The extruder of the disclosure can also be used for better management of extruder stoppage, standby and restart phases. To do so, the difference in rotational speed between the screw and the rotary barrel is controlled as a function of the variation in extruder efficiency. Extruder efficiency is defined here as the output per unit time. Thus, after stoppage and standby phases it is found, upon restart, that there is an increase in temperature of the blend which is associated with the loss of efficiency of the extruder caused by the heating-up of the blend present in the extruder, which has the effect of causing the screw to slip. It is thus necessary to limit the work imparted to the blend. To do that, the speed of the rotary barrel with respect to that of the screw is made to vary as a function of the slipping of the screw. The more the screw slips (and therefore loses efficiency), the closer the speed of the barrel needs to be to that of the screw, the two of them rotating in the same direction. As the slipping of the screw gradually decreases, the difference in speeds between the rotary barrel and the screw will increase.

Where there is a desire to limit the mechanical work conferred upon the blend, the rotary barrel can be switched to passive mode which consists in letting the barrel rotate about the axis XX' solely under the effect of the circulation of the blend propelled by the rotation of the screw and flowing in the homogenization zone. In this configuration, when likewise it is desirable for the rotational speed of the rotary barrel to be lower than the rotational speed of the screw, it may prove necessary, depending on the orientation of the flight elements of the rotary barrel, to apply a braking torque to the rotary barrel. This braking torque generates an electric current in the motor 600. This generated electric current can be reused to drive the motor of the screw with a view to optimizing the overall efficiency of the extruder.

In order to empty the device the screw and the rotary barrel are made to rotate alternately in the same direction and in opposite directions so as successively to empty the various stages of flights situated in the homogenization zone.

The embodiments of the disclosure used as a basis for the present description are therefore non-limiting insofar as they make it possible to obtain the technical effects as described and claimed.

The invention claimed is:

1. An extruder for shaping a viscous material such as a blend of rubber, comprising:
   a screw rotationally driven by a first motor unit about an axis (XX') in a barrel and bearing one or more helical flights extending radially outwards from a central shaft of the screw, the extruder includes a material homogenization zone (H) through which a screw portion comprising interrupted flight elements forming empty annular spaces that extends axially, and
   a barrel portion delimiting the said homogenization zone bearing flight elements extending radially inwards into the said empty annular spaces beyond the vertices of the flight elements of the screw,
   wherein the barrel portion delimiting the homogenization zone is itself rotationally driven by a second motor unit about the axis XX' to form a rotary barrel.

2. The extruder according to claim 1, wherein the homogenization zone of the screw comprises at least one ring mounted on the screw comprising the said flight elements which are imbricated between the said flight elements borne by a barrel-forming ring.

3. The extruder according to claim 1, wherein the diameter of the screw in the zone of the extruder that lies upstream of the homogenization zone is less than the diameter of the screw in the homogenization zone.

4. The extruder according to claim 1, wherein the homogenization zone (H) is positioned, with respect to the direction of extrusion of the endless screw, in the downstream part of the extruder.

5. The extruder according to claim 1, wherein the flight elements borne by the rotary barrel form, with the axis of rotation XX', a positive angle (a) such that they are organized in a helix oriented in the same direction as the direction of the helix formed by the flights of the screw.

6. The extruder according to claim 1, wherein the flight elements borne by the rotary barrel form, with the axis of rotation XX', a negative angle (a') such that they are organized in a helix oriented in the opposite direction to the direction of the helix formed by the flights of the screw.

7. The extruder according to claim 1, wherein the flight elements borne by the rotary barrel form, with the axis of rotation XX', a zero angle.

8. The extruder according to claim 1, wherein one or more flight elements borne by the rotary barrel are individually rotationally driven on themselves about a radial axis.

9. The extruder according to claim 1, wherein the homogenization zone (H), the flight elements of the screw and of the rotary barrel have the form of a blade comprising at least one cutting edge facing the upstream end of the homogenization zone with respect to the direction of extrusion.

10. The extruder according to claim 1, wherein the flight elements borne by the rotary barrel are pins of substantially cylindrical shape.

11. A method for extruding a viscous material such as a blend of rubber, characterized in that use is made of an extruder according to claim 1, in which the speed of the rotary barrel with respect to the speed of the screw and/or the direction of rotation of the barrel with respect to the screw is/are varied in order to alter the rheological state of the viscous material flowing through the homogenization zone.

12. The method according to claim 11, wherein the difference in rotational speed between the screw and the rotary barrel is controlled as a function of the temperature of the viscous material at the inlet to the homogenization zone.

13. The method according to claim 11, wherein the difference in rotational speed between the screw and the rotary barrel is controlled as a function of the roughness of the material at the outlet of the extruder.

14. The method according to claim 11, wherein the difference in rotational speed between the screw and the rotary barrel is controlled as a function of the variation in efficiency of the extruder.

15. The method according to claim 11, wherein the rotary barrel rotates in the same direction of rotation as the screw at the same or a higher speed.

16. The method according to claim 11, wherein after the extruder has been stopped for some time, the rotary barrel is made to rotate while keeping the screw stationary, so as to raise the temperature of the viscous material contained in the homogenization zone again.

17. The method according to claim 11, wherein the rotary barrel rotates at a rotational speed lower than the rotational speed of the screw or in the opposite direction to the direction of rotation of the screw.

18. The method according to claim 11, wherein the rotary barrel is rotationally driven solely under the effect of the forward motion of the viscous material propelled by the rotation of the screw and flowing in the homogenization zone.

19. The method according to claim 18, wherein a braking torque is applied to the rotary barrel so that the rotational speed of the rotary barrel is lower than the rotational speed of the screw.

20. The method according to claim 11, wherein the screw and the rotary barrel are made to rotate alternately in the same direction and in opposite directions in order successively to empty the various stages of flights situated in the homogenization zone.

21. The method according to claim 11, wherein power is added to an extruder in order to increase its throughputs by adding a rotary barrel that is motorized so as to supply the blend with energy in addition to that supplied by the screw of the extruder.

22. The extruder according to claim 1, wherein the first motor unit and the second motor unit are arranged to drive the rotary barrel and screw in opposite rotational directions.

23. The extruder according to claim 1, wherein the first motor unit and the second motor unit are arranged to drive the rotary barrel and screw in the same rotational direction.

24. The extruder according to claim 1, wherein the first motor unit and the second motor unit are arranged to drive the rotary barrel and screw at different rotational speeds.

* * * * *